United States Patent
Cook et al.

(10) Patent No.: US 7,845,370 B2
(45) Date of Patent: Dec. 7, 2010

(54) EQUALIZATION OF PRESSURE IN AN ELECTRONICALLY CONTROLLED VALVE

(75) Inventors: Daniel C. Cook, Terryville, CT (US); Blake D. Carter, Norwalk, CT (US); Roger Edwin Howe, New Canaan, CT (US)

(73) Assignee: Enfield Technologies, LLC, Trumbull, CT (US)

( * ) Notice: Subject to any disclaimer, the term of this patent is extended or adjusted under 35 U.S.C. 154(b) by 452 days.

(21) Appl. No.: 11/903,431

(22) Filed: Sep. 21, 2007

(65) Prior Publication Data

US 2008/0099087 A1 May 1, 2008

Related U.S. Application Data

(60) Provisional application No. 60/854,562, filed on Oct. 25, 2006.

(51) Int. Cl.
*F15B 13/044* (2006.01)
*F16K 31/02* (2006.01)

(52) U.S. Cl. .............................. 137/625.65; 251/129.07

(58) Field of Classification Search ............ 137/625.65; 251/129.07
See application file for complete search history.

(56) References Cited

U.S. PATENT DOCUMENTS

| | | | | |
|---|---|---|---|---|
| 2,342,763 | A * | 2/1944 | Smith | 251/282 |
| 4,040,445 | A * | 8/1977 | McCormick | 137/625.65 |
| 4,325,412 | A * | 4/1982 | Hayner | 137/625.65 |
| 4,407,323 | A * | 10/1983 | Neff | 137/625.65 |
| 4,544,129 | A * | 10/1985 | Ichiryu et al. | 137/625.65 |
| 4,574,844 | A * | 3/1986 | Neff et al. | 137/625.65 |
| 5,012,722 | A * | 5/1991 | McCormick | 137/625.65 |
| 5,076,537 | A * | 12/1991 | Mears, Jr. | 137/625.65 |
| 5,092,365 | A * | 3/1992 | Neff | 137/625.65 |
| 5,460,201 | A * | 10/1995 | Borcea et al. | 137/625.65 |
| 5,535,783 | A * | 7/1996 | Asou et al. | 137/625.65 |
| 5,960,831 | A | 10/1999 | Borcea et al. | 137/625.65 |
| 6,668,861 | B2 * | 12/2003 | Williams | 137/625.65 |
| 7,209,321 | B1 | 4/2007 | Bennett | 360/108 |
| 7,210,501 | B2 * | 5/2007 | Neff et al. | 137/625.65 |
| 7,322,375 | B2 | 1/2008 | Goldfarb et al. | 137/625.32 |

FOREIGN PATENT DOCUMENTS

WO WO-2009/088504 A1 7/2009

OTHER PUBLICATIONS

Data sheet SLOS401A, Sep. 2002 (revised Oct. 2002) for the DRV593/DRV594 from Texas Instruments, and subtitled "±3-A High-Efficiency PWM Power Driver", 23 pages.

(Continued)

*Primary Examiner*—John Rivell
(74) *Attorney, Agent, or Firm*—Harrington & Smith

(57) ABSTRACT

Disclosed herein is an electronically controlled valve. The electronically controlled valve includes a valve body and a spool. The valve body includes at least one fluid inlet port, at least one fluid outlet port, an upper cavity, and a lower cavity. The spool is disposed within the valve body. The spool includes a first end and an opening. The opening allows the lower cavity to be in fluid communication with the upper cavity.

18 Claims, 4 Drawing Sheets

OTHER PUBLICATIONS

Data sheet SBOs120, entitled "INA-145" and subtitled "Programmable Gain Difference Amplifier" (Mar. 2000 printing date), from Burr-Brown, Tucson, AZ, 13 pages.

Data Sheet DS39598E, entitled "PIC16F818/819 Data Sheet" and subtitled "18/20-Pin Enhanced Flash Microcontrollers with nanoWatt Technology" (2004), from Microchip, 176 pages.

Data sheet 29319.37H, entitled "3959" and subtitled DMOS Full-Bridge PWM Motor Driver (no date given), from Allegro Microsystems, Inc., Worcester, MA., 12 pages.

Data Sheet SBOS105, entitled "INA157" and subtitled "High-Speed, Precision Difference Amplifier", (Mar. 1999 printing date), from Burr-Brown, Tucson, AZ, 10 pages.

26-2000 Series, "High Pressure Reducing Up to 15,000 PSIG in/up to 10,000 PSIG out spring loaded/dome loaded/air actuated", revised Apr. 2004, Tescom Corporation, Elk River, MN 55330, USA, 4 pages.

* cited by examiner

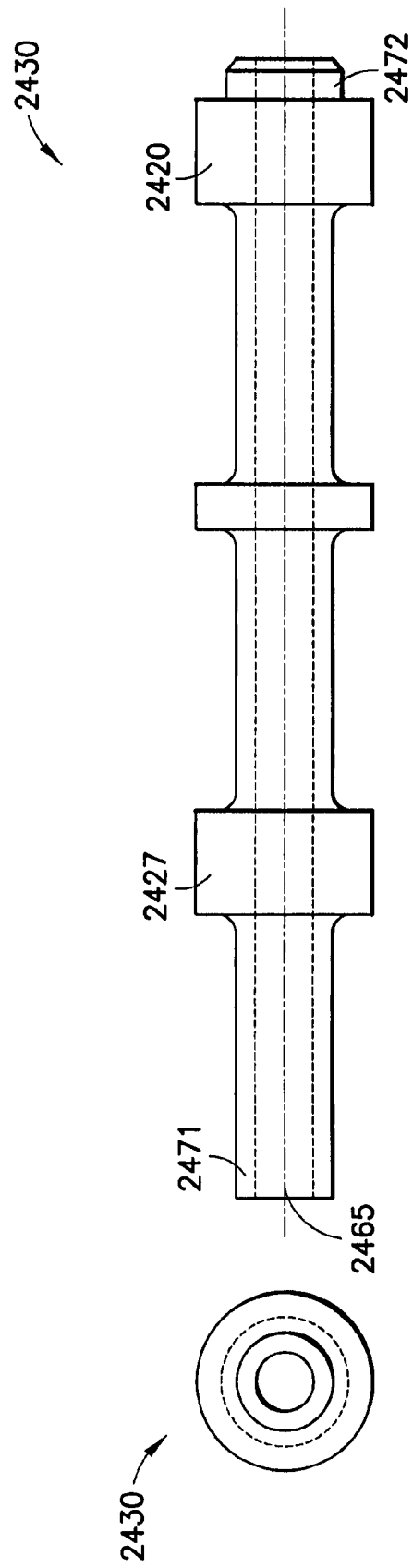

EQUALIZATION OF PRESSURE IN AN ELECTRONICALLY CONTROLLED VALVE

CROSS REFERENCE TO RELATED APPLICATION

This application claims priority under 35 U.S.C. §119(e) to U.S. provisional patent application No. 60/854,562 filed Oct. 25, 2006 which is hereby incorporated by reference in its entirety.

BACKGROUND OF THE INVENTION

1. Field of the Invention

The present invention relates to an electronically controlled valve and, more particularly, to equalizing pressure within an electronically controlled valve.

2. Brief Description of Prior Developments

Control systems for electronically controlled valves control many different types of fluids for many different purposes. While control systems, their controllers, and the associated electronically controlled valves have many benefits, these control systems, controllers, electronically controlled valves and portions thereof may still be improved.

U.S. Pat. No. 5,960,831 discloses an electromechanical servo valve for controlling the operation of an associated fluid control valve. The electronically controlled valve comprises a valve body having inlet and outlet ports, wherein the valve body houses a spool valve member connected to a movable header. One drawback to conventional configurations is that fluid leakage within the valve body increases pressures proximate the spool valve member. These increased pressures can oppose operating forces within the system, which affects dynamic performance, reduces system efficiency, and may ultimately result in valve failure.

Accordingly, there is a need to provide an electronically controlled valve having equalized pressures within the valve body.

SUMMARY OF THE INVENTION

In accordance with one aspect of the present invention, an electronically controlled valve is disclosed. The electronically controlled valve includes a valve body and a spool. The valve body includes at least one fluid inlet port, at least one fluid outlet port, an upper cavity, and a lower cavity. The spool is disposed within the valve body. The spool includes a first end and an opening. The opening allows the lower cavity to be in fluid communication with the upper cavity.

In accordance with another aspect of the present invention, a servo valve is disclosed. The servo valve includes a valve body, a valve actuator assembly, a sleeve, and a spool. The valve body includes at least one fluid inlet port, at least one fluid outlet port, an upper cavity, and a lower cavity. The valve actuator assembly is disposed within the upper cavity. The valve actuator assembly includes a spool connecting portion. The spool connecting portion comprises an opening extending therethrough. The sleeve is between the upper cavity and the lower cavity. The spool is slidably disposed within the sleeve. The spool includes a fluid conduit extending from a first open end of the spool to a second open end of the spool. The first open end is received by the opening of the spool connecting portion. The second open end is at the lower cavity.

In accordance with yet another aspect of the present invention, a method of assembling an electronically controlled valve is disclosed. A valve body is provided. The valve body has at least one fluid inlet port, at least one fluid outlet port, an upper cavity, a lower cavity, and a sleeve. The sleeve is between the upper cavity and the lower cavity. A spool is installed within the sleeve. The spool includes an opening. The opening allows for fluid communication between the lower cavity and the upper cavity. A valve actuator assembly is connected to an end of the spool.

BRIEF DESCRIPTION OF THE DRAWINGS

The foregoing aspects and other features of the present invention are explained in the following description, taken in connection with the accompanying drawings, wherein:

FIG. 4 is an end view along the minor axis of a hollow spool for use in pneumatic valves such as shown in FIGS. 2 and 3; and FIG. 5 is a side view along the major axis of the hollow spool of FIG. 4.

DETAILED DESCRIPTION OF THE PREFERRED EMBODIMENTS

Figure 1:
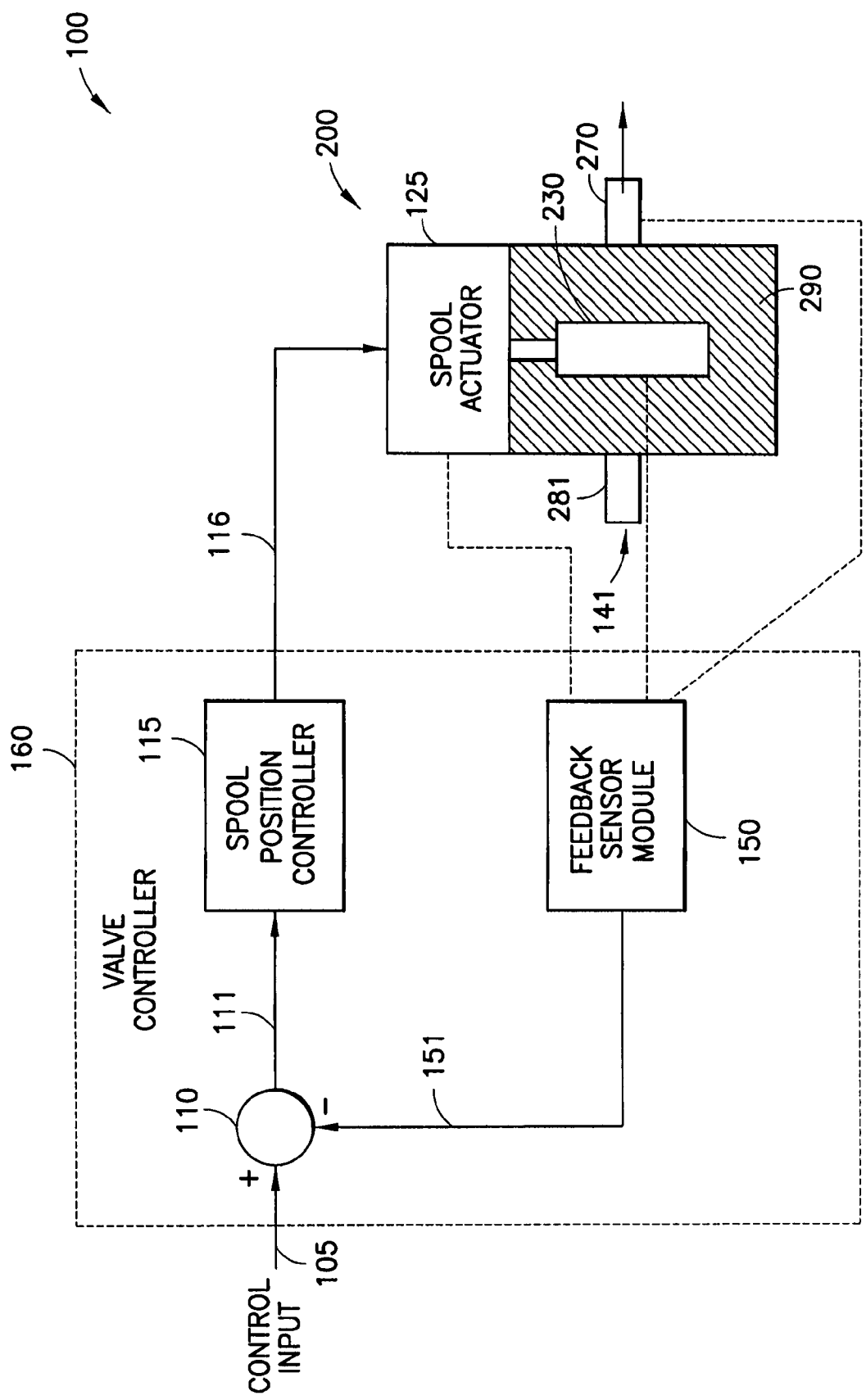
FIG. 1 is a block diagram of a system including a portion for controlling an electronically controlled valve and the electronically controlled valve.

Referring to FIG. 1, there is shown a block diagram of an exemplary system 100 having a portion for controlling an electronically controlled valve 200. System 100 also includes in this example the electronically controlled valve 200 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

FIG. 1 is a simplistic, high-level view of a system 100 that includes a control input 105, an adder 110, a spool position controller 115, the electronically controlled valve 200, and a feedback sensor module 150 that takes an input from one or more feedback sensors (not shown) and that produces one or more feedback signals 151. A valve controller 160 includes the adder 110, the spool position controller 115, and the feedback sensor module 150. The electronically controlled valve 200 includes a spool actuator 125, a spool 230, a body 290, an input 281, and an output 270.

The electronically controlled valve 200 controls fluid (e.g., gas, water, oil) 141 flow through the electronically controlled valve 200 by operating the spool 230. The spool actuator 125 controls movement of the spool 230 based on one or more control signals 116 from the spool position controller 115. The spool position controller 115 modifies the one or more control signals 116 based on the one or more input signals 111, which include addition of the control input signal 105 and the one or more feedback signals 151. The feedback sensor module 150 can monitor the spool actuator 125 (e.g., current through the spool actuator), a sensor indicating the position of the spool 230, or sensors indicating any number of other valve attributes (e.g., pressure or flow rate of the fluid 141) and/or spool actuator 125 or spool 230 attributes (e.g. temperature, acceleration, velocity, etc.). It should also be noted that the actuator 125 may be a non-pilot controlled actuator. Additionally, the actuator 125 may be internal or external to the valve body. It should also be understood that the actuator 125 may be electromagnetic. However, any suitable type of actuator may be provided.

Figure 2:
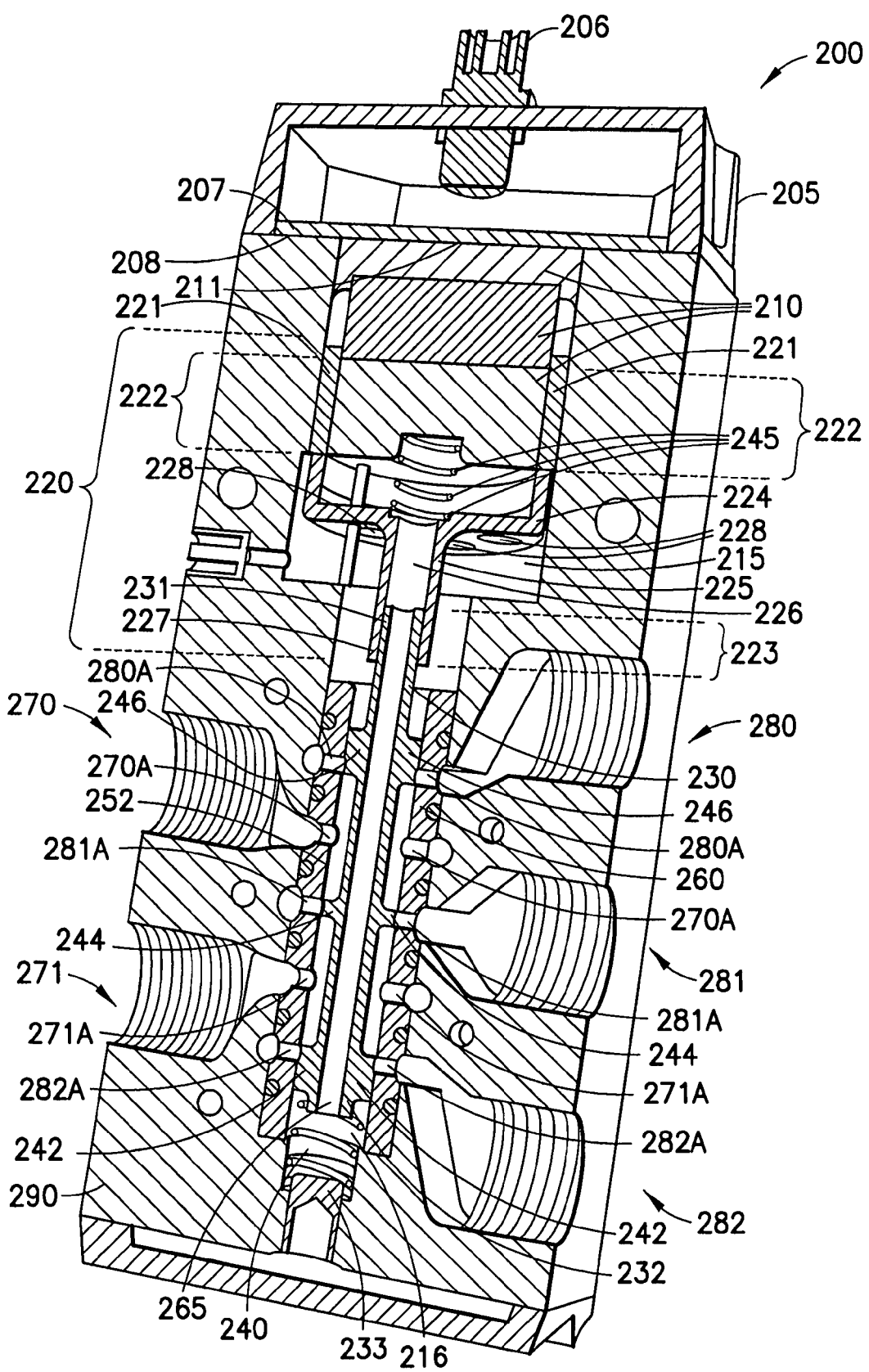
FIG. 2 is a cutaway, perspective view of an exemplary pneumatic valve.

Turning to FIG. 2 in addition to FIG. 1, a cutaway, perspective view is shown of the exemplary valve 200 in accordance with a first embodiment of the present invention. The valve 200 includes an electronics cover 205, a motor housing retainer 207, a motor housing 210, an upper cavity 215, a lower cavity 216, a valve actuator assembly 220, a spool 230, a sleeve 260, a lower spring 240, an upper spring 245, external ports 270, 271, 280, 281, and 282, circumferentially spaced internal ports 270a, 271a, 280a, 281a, and 282a, and a valve body 290. At least one of the external ports 270, 271, 280, 281, 282 is a fluid inlet port, and at least one of the external ports 270, 271, 280, 281, 282 is a fluid outlet port, such as wherein external port 281 is a fluid inlet port, and external ports 270, 271 are fluid outlet ports, for example. Additionally, it should be understood that the at least one fluid inlet port is connected to a suitable source of operating fluid such as a source for compressed air or hydraulic fluid, for example.

The valve actuator assembly 220, which may be a coil header assembly for example, is disposed within the upper cavity 215 and includes a voice coil portion 222, a base portion 224, and a spool connecting portion 225. The voice coil portion 222 extends from the base portion 224 and surrounds a portion of the motor housing 210. The voice coil portion 222 includes a voice coil 221. The base portion 224 comprises a plurality of circumferentially spaced holes 228 extending through the base portion 224. The spool connecting portion 225 extends from the base portion 224 in an opposite direction to that of the voice coil portion 222. The spool connecting portion 225 includes an opening 226 extending from an open end 227 through the axial length of the spool connecting portion 225 and through the base portion 224. The spool connecting portion 225 further comprises an overlap portion 223 proximate the open end 227 that overlaps a portion of the spool 230 and connects the spool 230 to the coil header assembly 220. The opening 226 receives a first end 231 of the spool 230. The spool 230 is connected to the spool connecting portion 225 at the overlap portion 223 by any suitable fastening means, such as a threaded connection, or a press fit connection, for example. It should be noted that for the purposes of clarity, a simplistic view of the spool actuator 125 is shown in FIG. 1. FIG. 2 illustrates the components forming the spool actuator which includes: the motor housing 210, the coil header assembly 220, the upper spring 245, and the lower spring 240. The upper spring 245 is disposed within the upper cavity 215 between the motor housing 210 and the coil header assembly 220. One end of the upper spring 245 contacts the motor housing 210. The other end of the upper spring 245 contacts the coil header assembly 220 proximate the intersection of the opening 226 and the base portion 224. The lower spring 240 is disposed within the lower cavity 216 between the spool 230 and an adjustable set screw 233. One end of the lower spring 240 contacts the adjustable set screw 233. The other end of the lower spring 240 contacts a second end 232 of the spool 230. The spool 230 is slidably disposed within the sleeve 260 between the two springs 240, 245. The sleeve 260 is disposed within the valve body between the upper cavity 215 and the lower cavity 216. However in alternate embodiments, the sleeve 260 may not be a separate member and may instead be integral with the valve body 290. The springs 240, 245 exert a spring bias on opposing ends of the spool 230. It is noted that at least a portion of the motor housing 210 is magnetized in order to be responsive to the voice coil 221.

In this example, a top surface 211 of the motor housing 210 contacts a bottom surface 208 of motor housing retainer 207. The motor housing 210 is therefore held in place by the motor housing retainer 207, and the motor housing retainer 207 may be a printed circuit board. However, alternate embodiments may provide any suitable motor housing retainer. Additionally, it is to be noted that in alternate embodiments the valve 200 may comprise elements/components providing for features such as dead band elimination, variable frequency and amplitude dither, retaining mechanical elements having static or dynamic forces thereon, integration of electronics in a pneumatic valve body, mounting techniques for electronic modules in various products, closed loop current control of a voice coil using pulse width modulation drive elements, and/or techniques for control of an air loaded regulator and cascaded control loops, for example.

The exemplary spool 230 includes a passage 265. The passage 265 has a number of purposes, including equalizing pressure between the upper cavity 215 and the lower cavity 216, as described in more detail below. The passage 265 extends the entire length of the spool 230 between the top and bottom ends of the spool.

As also described below, the electronics cover 205 includes a connector 206 used to couple a spool position controller 115 to the voice coil 221 (or couple other useful signals from the valve internal to the control electronics) on voice coil portion 222. The electronics cover 205 is one example of a cover used herein.

The valve 200 is similar to the valve shown in U.S. Pat. No. 5,960,831, which is hereby incorporated by reference in its entirety, and is assigned to the assignee of the present application. A description of exemplary operation of the valve 200 is included in U.S. Pat. No. 5,960,831. U.S. Pat. No. 5,960,831 describes, for instance, airflow through the external ports 270, 271, 280, 281, and 283 and the circumferentially spaced internal ports 270a, 271a, 280a, 281a, and 283a. It is noted that the springs 240, 245 along with the coil header assembly 220, motor housing 210, and spool 230, are configured such that the spool 230 blocks the ports 281A when no power is applied to the voice coil 221. Other portions of pneumatic valve 200 are also described in U.S. Pat. No. 5,960,831.

The spool 230 has several 'lands' 242, 244, and 246 that block flow from the ports 282A, 271A, 281A, 270A, and 280A (collectively, "ports" herein) in the sleeve 260. Miniature gaps between the lands 242, 244, and 246 and the inner surface 252 of the sleeve 260 may allow for fluid leakage within the valve body 290. This fluid leakage may increase the pressure in portions of the valve body. The disclosed spool 230 provides for a technique for equalizing pressures in a pneumatic valve.

Figure 3:
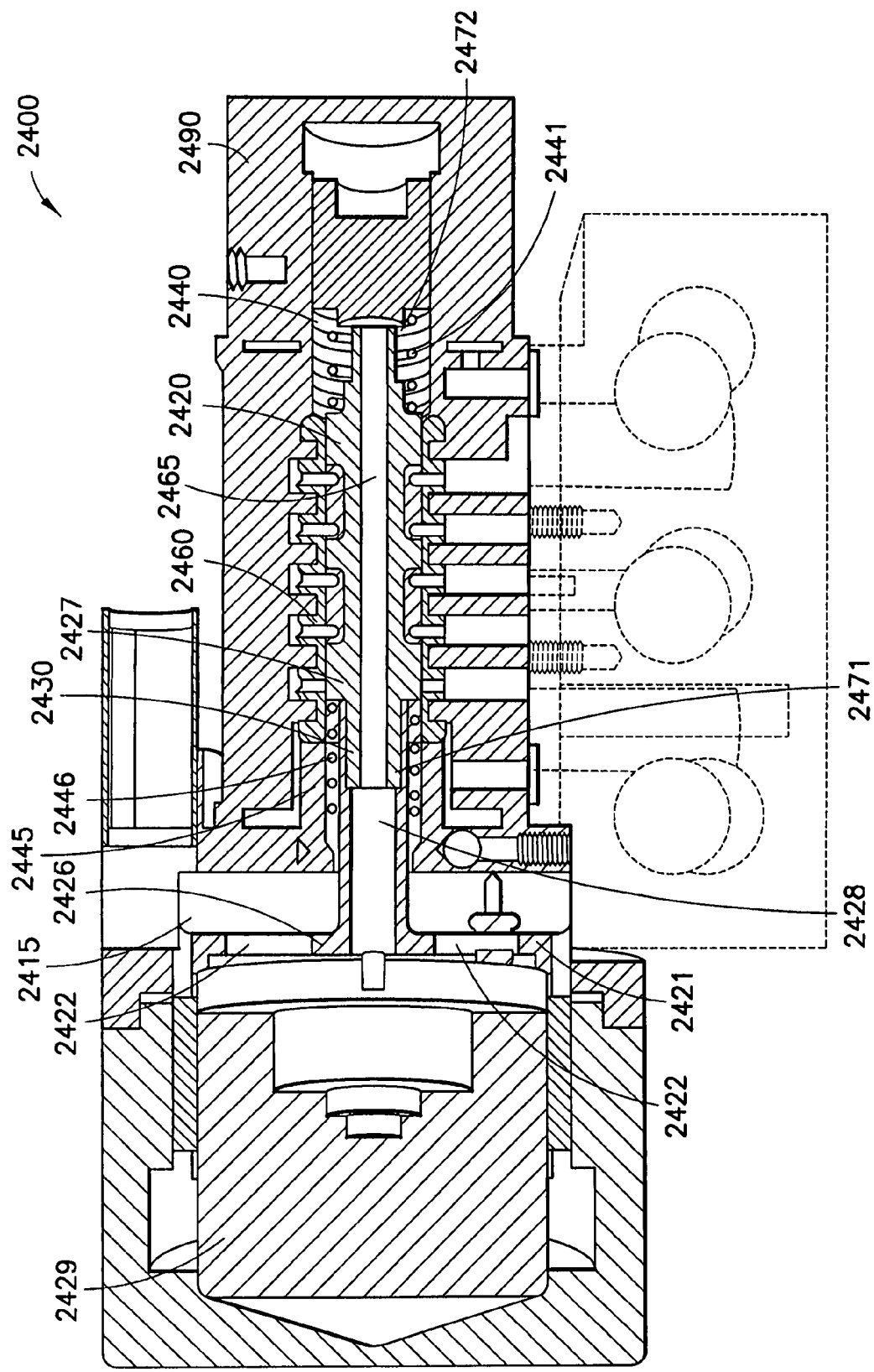
FIG. 3 is a side cross-sectional view of a pneumatic valve similar to the pneumatic valve of FIG. 2.

Referring now to FIG. 3 with appropriate reference to previous figures, a side cross-sectional view is shown of a valve 2400 in accordance with a second embodiment of the present invention. The valve 2400 is similar to the valve 200 of FIG. 2. The discussion below regarding exhaust leakage also applies to the pneumatic valve 200 of FIG. 2. The pneumatic valve 2400 includes a valve body 2490 (similar to the body 290), a set screw chamber 2440 (similar to the lower cavity 216), a voice coil chamber 2415 (similar to the upper cavity 215), an upper spring 2446 (similar to the upper spring 245), a coil header assembly 2421 (similar to the coil header assembly 220), a lower spring 2441 (similar to the lower spring 240), a sleeve 2460 (similar to the sleeve 260) and a spool 2430 (similar to the spool 230). One difference between the valve 2400 and the valve 200 is the location of the upper spring 2446. The spring 2446 is disposed around a spool connecting portion 2426 (similar to the spool connecting portion 225) of the coil header assembly 2421. One end of the upper spring 2446 contacts a land 2427 (similar to the land 246) of the spool 2430. The other end of the upper spring 2446 contacts a sleeve retainer 2445. The springs 2441, 2446 exert a spring bias on opposing ends of the spool 2430.

At higher operating pressures, air may leak past the exhaust land 2420 (similar to the land 242) into a sealed chamber, set screw chamber 2440. In a conventional configuration having a solid spool, the set screw chamber 2440 would build pressure and cause an offset in force to oppose operating forces in the system, placing the solid spool in an unpredictable position. Another effect of a sealed set screw chamber 2440 with a small volume in a conventional configuration is that solid spool displacement into the volume of the set screw chamber 2440 causes a slight increase in pressure (and vice versa). In conventional configurations this effect would add a non-linear spring effect that would affect dynamic performance. Additionally, conventional solid spools have a relatively large amount of mass that must be moved.

One conventional solution to the exhaust and non-linear spring problems is to vent the set screw chamber 2440 to atmosphere; however, this solution would likely compromise environmental sealing such as water tightness. Another conventional solution is external porting to connect the two chambers (set screw chamber 2440 and voice coil chamber 2415) pneumatically. External porting would solve the exhaust and non-linear spring problems by ensuring that the chambers 2440, 2415 remained at the same pressure; however, cross porting would be required as well as deep drilling operation, both of which add cost to the valve body 2490.

An exemplary solution to the exhaust and non-linear spring problems is to manufacture the hollow spool element 2430 having open ends, which completely connects (in fluid communication) the voice coil chamber 2415 with the set screw chamber 2440. FIG. 4 is an end view along the minor axis of the hollow spool 2430 for use in pneumatic valves such as shown in FIGS. 2 and 3. FIG. 5 is a side view along the major axis of the hollow spool 2430 of FIG. 4. The hollow spool 2430 contains a passage or fluid conduit 2465 sized and shaped to equalize pressure within the valve body 2490 during static leak and dynamic operation. Manufacturing the hollow spool 2430 ensures that the pressures on both ends of the spool 2430 are approximately equal under most or all conditions.

A first end 2471 of the spool 2430 is received by the spool connecting portion 2426. The spool connecting portion 2426 comprises an opening 2428 (similar to the opening 226). The connection between the spool connecting portion 2426 and the spool 2430 forms a fluid passage which allows the set screw chamber 2440 to be in fluid communication with the voice coil chamber 2415. Clearance between a motor housing 2429 (similar to the motor housing 210) and the coil header assembly 2421, as well as base portion holes 2422 (similar to the holes 228), allow for fluid communication between the opening 2428 and the voice coil chamber 2415. A second end 2472 of the spool 2430 is open at the set screw chamber 2440 allowing for fluid communication therebetween.

It should be noted that although the figures illustrate the holes 2422 in the base portion aligned in a circular array, alternative embodiments may comprise any configuration, number, or orientation of holes suitable for fluid communication.

In an exemplary embodiment, the substantially uniform hole diameter used to form passage 2465 is chosen such that rapid spool motion will not restrict the displacement air flow required to keep air pressures approximately equal (as very small pressure differences may exist dependent on leak size and spool velocity) between the voice coil chamber 2415 and the set screw chamber 2440. Since the hole diameter is a relatively large diameter for pneumatic purposes, the mass is reduced appreciably, which has an added benefit of increasing dynamic performance. It is noted that a number of possible hole diameters may be used, depending on, e.g., pneumatic and spool strength criteria. It should also be noted that although the figures illustrate the opening as a cylindrical opening, any suitable shape for equalizing pressure may be provided.

It should be understood that although portions of the disclosure are made with reference to a pneumatic valve, the disclosed electronically controlled valves may also be provided for controlling the operation of an associated fluid control valve such as a hydraulically operated valve for example.

In the past, conventional configurations having solid spools without a passage within the spool experience a pressure mismatch problem. This mismatch problem occurs when fluid leakage within the valve body causes the pressure at either the upper cavity or the lower cavity to increase. This increased pressure at one of the cavities applies a pressure force to the respective end of the spool which works against the normal spool actuation forces. The disclosed hollow spool solves the pressure mismatch problem by providing a fluid passage within the spool and between the upper cavity and the lower cavity to allow the pressures to be equalized. This provides for an improved valve having the advantages of increased efficiency, greater reliability, and improved dynamic performance.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A controlled valve comprising:
   a valve body comprising at least one fluid inlet port, at least one fluid outlet port, an upper cavity, and a lower cavity;
   a spring at the upper cavity;
   a coil header assembly comprising a voice coil portion and a base portion having an opening, wherein the coil header assembly is at the upper cavity, wherein the spring is at one side of the base portion, and wherein a spool connecting portion extends from an opposite side of the base portion;
   a spool disposed within the valve body, wherein the spool comprises a first end and an inner passage, wherein the first end is connected to the coil header assembly at the spool connecting portion, and wherein the inner passage allows the lower cavity to be in fluid communication with the upper cavity through the opening in the coil header assembly; and
   a motor housing at the valve body, wherein the spring is disposed between the motor housing and the base portion.

2. The controlled valve of claim 1 wherein the valve is configured to be actuated directly by a non-pilot controlled actuator, and wherein the actuator is directly connected to the spool.

3. The controlled valve of claim 2 wherein the actuator is internal to the valve body.

4. The controlled valve of claim 3 wherein the actuator is electromagnetic.

5. The controlled valve of claim 4 wherein the valve is electronically controlled.

6. The controlled valve of claim 1 wherein the spool is slidably disposed within the valve body.

7. The controlled valve of claim 6 wherein the valve is configured to be actuated directly by a non-pilot controlled actuator, and wherein the actuator is directly connected to the spool.

8. The controlled valve of claim 7 wherein the actuator is internal to the valve body.

9. The controlled valve of claim 8 wherein the actuator is electromagnetic.

10. The controlled valve of claim 9 wherein the valve is electronically controlled.

11. A servo valve comprising:
- a valve body comprising at least one fluid inlet port, at least one fluid outlet port, an upper cavity, and a lower cavity;
- a valve actuator assembly disposed within the upper cavity, wherein the valve actuator assembly comprises a base portion, a voice coil portion, and a spool connecting portion, wherein the base portion comprises a hole in fluid communication with the upper cavity, wherein the voice coil portion extends from a first side of the base portion, wherein the spool connecting portion is connected to the base portion, wherein the spool connecting portion extends from a second side of the base portion, wherein the spool connecting portion comprises an opening extending therethrough, and wherein the opening of the spool connecting portion extends through the base portion;
- a sleeve between the upper cavity and the lower cavity;
- a spool slidably disposed within the sleeve, wherein the spool comprises a fluid conduit extending from a first open end of the spool to a second open end of the spool, wherein the first open end is received by the opening of the spool connecting portion, and wherein the second open end is at the lower cavity; and
- a motor housing and an upper spring, wherein the upper spring is disposed between the motor housing and the base portion.

12. The servo valve of claim 11 wherein the fluid conduit is configured to equalize pressure between the upper cavity and the lower cavity.

13. The servo valve of claim 11 wherein the base portion comprises a plurality of holes extending through the base portion.

14. The servo valve of claim 11 wherein an end of the upper spring is at the opening of the spool connecting portion which extends through the base portion.

15. The servo valve of claim 11 further comprising a lower spring disposed within the lower cavity, wherein a first end of the lower spring contacts the second open end of the spool.

16. The servo valve of claim 15 further comprising an adjustable set screw, wherein the adjustable set screw is connected to the valve body proximate the lower cavity, and wherein a second end of the lower spring contacts the adjustable set screw.

17. The servo valve of claim 11 further comprising an upper spring, wherein the spring is disposed around the spool connecting portion, and wherein one end of the upper spring contacts the spool.

18. A servo valve comprising:
- a valve body comprising at least one fluid inlet port, at least one fluid outlet port, an upper cavity, and a lower cavity;
- a spring at the upper cavity;
- a valve actuator assembly disposed within the upper cavity, wherein the valve actuator assembly comprises a base portion, a voice coil portion, and a spool connecting portion, wherein the base portion comprises a hole in fluid communication with the upper cavity, wherein the voice coil portion extends from the base portion, wherein the spool connecting portion is connected to the base portion, and wherein the spool connecting portion comprises an opening therein;
- a sleeve between the upper cavity and the lower cavity;
- a spool slidably disposed within the sleeve, wherein the spool comprises a fluid conduit extending from a first open end of the spool to a second open end of the spool, wherein the first open end is received by the opening of the spool connecting portion, and wherein the second open end is at the lower cavity; and
- a motor housing at the valve body, wherein the spring is disposed between the motor housing and the base portion.

* * * * *